E. WARD.
Attaching Runners to Wheels.
No. 52,916. Patented Feb 27, 1866.
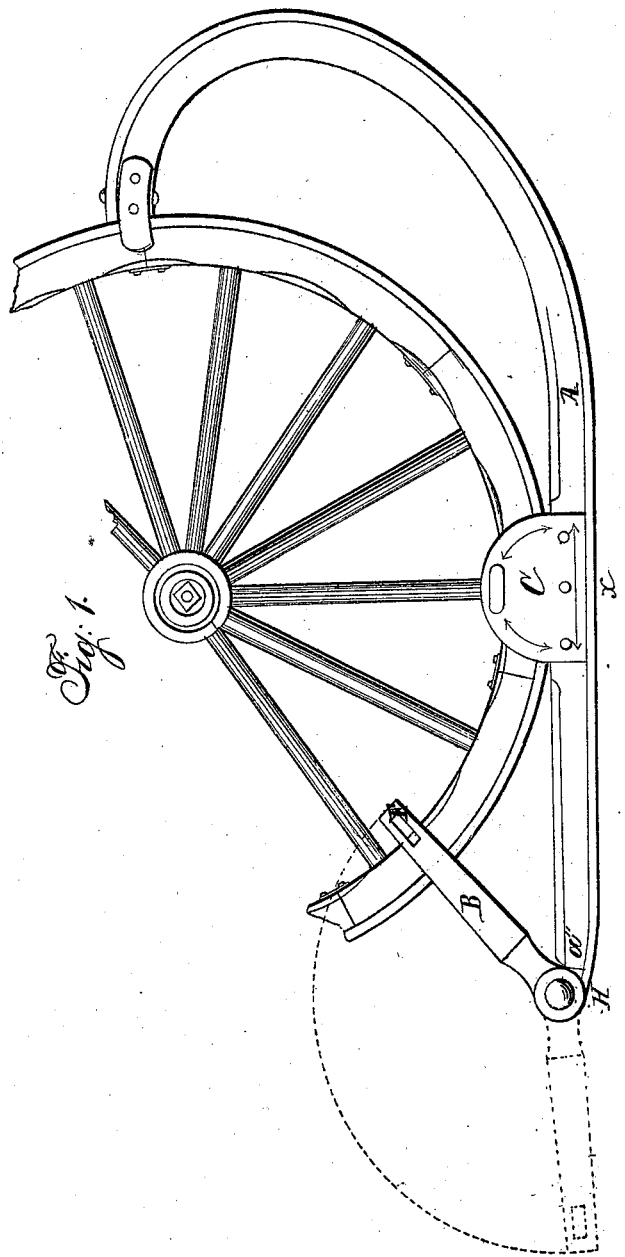

UNITED STATES PATENT OFFICE.

EUGENE WARD, OF NEW YORK, N. Y.

IMPROVEMENT IN ATTACHING RUNNERS TO WHEELS OF WAGONS.

Specification forming part of Letters Patent No. 52,916, dated February 27, 1866.

*To all whom it may concern:*

Be it known that I, EUGENE WARD, of the city, county, and State of New York, have invented a new and useful Improvement for Attaching Runners to the Wheels of Vehicles; and I do hereby declare that the following is a full, clear, and exact description thereof, reference being had to the accompanying drawings, and to the letters of reference marked thereon and made to form part of this specification, and similar letters referring to like parts of the improvement.

The many efforts directed to attaching runners to the wheels of vehicles, thus facilitating their progress through snow, neglect one of two essential points. Either the runner is secured to the one wheel at two places only, or being fastened at three different points, causing the vehicle to be bodily raised in order to attach it. If a runner is fastened at two points of a wheel only, its defects will be apparent on turning the vehicle, for the part marked $a''$, Figure 1, will act as a lever, tending to tear the runner from its fastening to the wheel at $c$, equally so in backing a vehicle thus arranged, a sudden resistance, as a stone or rut coming at the end $a''$ of the runner A, would cause the entire strain to come on one of the two fastenings. In either of these cases it will be seen a runner or shoe-fastener at the three outer peripheries of a wheel—*i. e.*, the front, lower, and rear peripheries—has a decided advantage over one fastened in two places only, as, in the first place, on turning a vehicle employing this method the strain would be distributed equally, or nearly so, between the three fastenings, thus certainly making the runner more secure; and, secondly, on backing, in coming in contact with the same resistance as supposed in the other case, the third fastening coming at and between the rear periphery of the wheel and the end $a''$ of a runner, A, would act as a brace between the resistance and the wheel, thus relieving the other two fastenings of a pulling strain.

It might be argued that if a runner was not continued to the rear, or moderately so, past the point $x$, Fig. 1, little if any leverage could exist to wrench the fastening at C in turning. Acknowledging this it will be found, however, in backing a vehicle employing this method, that both runner and wheel would make a revolution, and that it is extremely essential the runner should continue some distance back from the point $x$. It will be also noticed the longer the runner reaches to the rear from the point $x$ (supposing it to be fastened at three points) the higher the back fastening will be from the upper portion of the runner, thus, though giving much more strength, causing the wheel to be lifted proportionately higher in order to be removed.

Having endeavored to prove the superiority of a runner being secured to a wheel of a vehicle at three separate points—*i. e.*, the front, lower, and rear peripheries—I will proceed to show the great obstacle to such an arrangement, which obstacle is entirely obviated by my improvement.

If a runner be attached to a wheel at three places, it will be found that that end of it which touches the rear periphery of the wheel will be considerably higher than the upper portion of the runner on which the wheel rests. If this part be permanently fixed, as before used, (to illustrate this, suppose the piece B or its modification to be permanent,) it will be found necessary on the removal of the runner that the vehicle should be bodily raised. Supposing it be desired to attach a runner to a vehicle of immense weight, or one having great weight as a load, it becomes necessary that the load be first removed, or that a leverage be applied to obtain the desired result, in either case being a great drawback to the general utility of such a plan. To obviate these defects my plan is proposed, and I will proceed to describe its construction and operation.

To enable others skilled in the art to make and use my improvement, I will proceed to describe its construction and operation by referring direct to the accompanying drawings, in which—

Fig. 1 represents an ordinary runner or shoe attached to a wheel of a vehicle, at one end of which the piece B is secured in such a manner that it may be thrown into the position of the dotted lines. Figs. 2 and 3 represent the piece B, having a hinge, H, and flanges F. Cut crosswise through these flanges is the hole $o$. A wedge, W, fits this hole, which on being driven in causes the space between that part of it marked $p''$ and that part of the piece B marked $b''$ to be reduced.

In using my invention the piece B is thrown into the position indicated by the dotted lines, Fig. 1, and the wheel of the vehicle rolled over said part B on the runner until it is in its proper position, when the piece B is turned up, the flanges F coming on each side of the fellies, while the part marked b" pressing firmly the tire of the wheel when the wedge W is driven in, causing that part of the wheel to be held firmly in its place. The great advantage, then, of having runners secured to wheels at three separate points, which with equal strength to others shall possess the advantage of being readily removed by merely removing a wedge, throwing back a hinge, and backing a vehicle from them without any exertion in lifting the weight of said vehicle, is at once apparent and certainly of great utility.

I do not claim a runner or shoe to be attached to the wheels of vehicles, nor the hole o, flanges F, wedge W, and hinge H, *per se*.

The plates C are to be bolted upon the sides of the runner A or attached in any desired manner, and openings are to be formed in these plates for the reception of a wedge or peg to pass across and secure the felly of the wheel. A similar device may be used at the upper end of the runner, but the cross-key or peg is not required, as the pressure in drawing the vehicle keeps the wheel and runner together at this point.

What I claim, and desire to secure by Letters Patent, is—

The hinged brace B, fitted as specified, in combination with the runner A, constructed substantially as specified, so as to be connected to the wheel at two points, as set forth.

EUGENE WARD.

Witnesses:
FORBES PARKER,
N. B. BREWER.